July 16, 1968  C. T. NYE  3,392,517
FRUIT HARVESTER
Filed Sept. 2, 1966
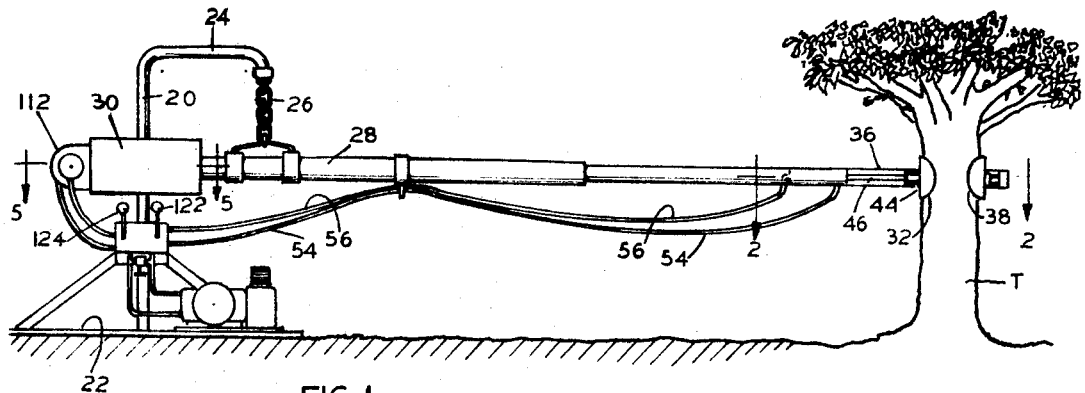
FIG. 1
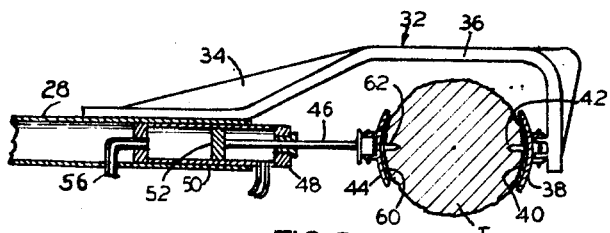
FIG. 2
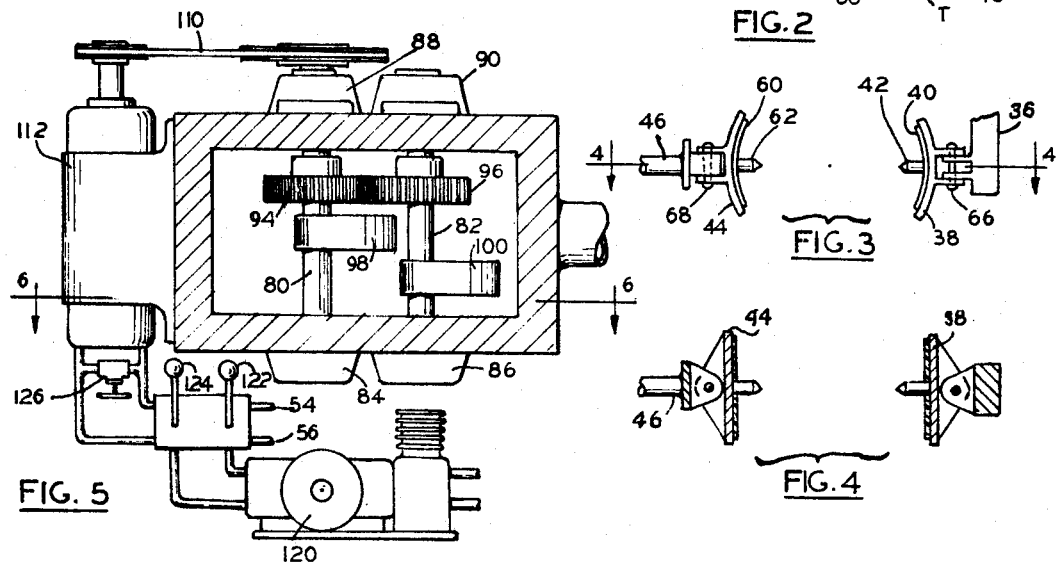
FIG. 3
FIG. 4
FIG. 5
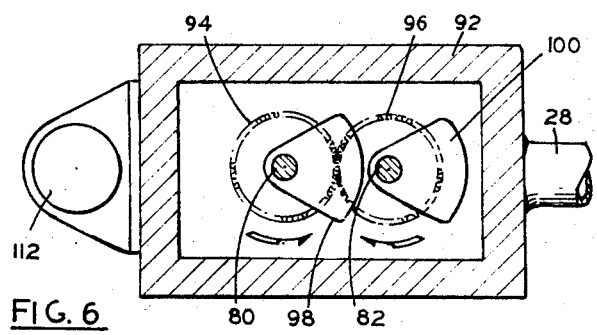
FIG. 6
INVENTOR.
CUYLER T. NYE.
BY
ATTORNEY

United States Patent Office 3,392,517
Patented July 16, 1968

3,392,517
FRUIT HARVESTER
Cuyler T. Nye, R.D. 3, Lyons, N.Y. 14489
Continuation-in-part of application Ser No. 370,731,
May 27, 1964. This application Sept. 2, 1966, Ser.
No. 576,986
7 Claims. (Cl. 56—328)

ABSTRACT OF THE DISCLOSURE

Apparatus for applying vibratory forces to a tree trunk over a range of frequencies sufficient to embrace a resonant frequency of vibration of the tree to cause fruit to drop from the tree limbs, comprising a boom having a hydraulic clamp adapted to solidly embrace the tree trunk on opposite sides of a diameter of the tree trunk aligned with the boom, and counter rotating inertia weights on the other end of the boom rotatable through a wide range of speeds to provide the vibratory forces, the clamp having a sharp pin to embed in the trunk, and means for supporting the boom in suspension from its approximate center of gravity.

---

This application is a continuation-in-part of application Ser. No. 370,731, filed May 27, 1964, and now abandoned.

This invention relates to fruit harvesting apparatus of an inertia vibrating type.

The harvest of fruit, including cherries, nuts and the like, have been accomplished by the vigorous shaking of the tree branches to shake the fruit loose. The apparatus proposed for shaking the tree branches has included reciprocating power cylinders, rotating cranks of various kinds, and equivalent movement creating devices, all of which have been adapted to move the tree limbs of a tree. The actual rate of movement has been slow, and the power required relatively high. Because actual shaking movement of the limbs has been the desired effect, the apparatus has been designed to be quickly moved from one tree limb to another of the same tree, so as to shake the limbs of the tree in sequence.

The present invention is directed to apparatus adapted to apply a vibratory inertia force to a tree trunk, whereby to apply the vibratory inertia forces to the entire tree simultaneously. The invention is directed to apparatus for rigidly gripping the trunk of a tree below the limbs, and for preventing any relative movement between the gripping apparatus and the tree trunk. The invention is further directed to apparatus for applying vibratory inertia forces to a tree trunk in such a manner as to minimize and practically eliminate actual movement of the apparatus and eliminate relative movement between the apparatus and the tree trunk, and minimize the movement of the tree itself, while increasing the vibratory force of the inertia apparatus, and utilizing the resonant vibration frequency of the tree, by varying the frequency of the vibrations imparted to the tree trunk until resonance is attained. In this manner, the harvest of an entire tree may be effected during a single brief period when the rate of vibration of the apparatus and the resonant period of the tree are in harmony. By providing a rigid connection between the trunk and apparatus, the range of speed through which the inertia vibratory force can be driven, with a small amount of power, is sufficiently great to include a speed that matches the inherent resonance of the tree itself. The rigid coupling of the apparatus to the tree, eliminating any resilience or lost motion between tree and apparatus, prevents injury to the tree trunk.

When the resonant speed is reached, maximum effectiveness in causing the fruit to drop is achieved, and harvesting of the entire tree takes place in a brief interval. The only perceptible movement of the tree appears to be in the effect upon the leaves. In a cherry tree, such leaves tend to rise up and stand on end, exposing their silvery lighter green under color, while the cherries detach themselves and drop.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 1 is a side elevational view of the apparatus coupled to a tree trunk;

FIGURE 2 is an enlarged sectional view of the clamp and clamp cylinder;

FIGURE 3 is a further enlarged fragmentary plan view of the clamp elements;

FIGURE 4 is a sectional view of the clamp elements taken on the line 4—4 of FIGURE 3;

FIGURE 5 is an enlarged sectional view of the inertia vibrating apparatus taken substantially on the line 5—5 of FIGURE 1, with the hydraulic pressure supply apparatus schematically indicated, and FIGURE 6 is a sectional view substantially on the line 6—6 of FIGURE 5.

In FIGURE 1, there is shown a support arm 20 extending upright from a platform 22 or other support, such as a mobile tractor. Freely suspended from the laterally projecting portion 24 of the arm 20, by a flexible chain 26, is a rigid tubular boom 28, on one end of which is the vibratory inertia apparatus 30, and on the other end of which, is a clamp 32 for gripping the trunk of a tree T. The clamp comprises a heavy arm extension 34, secured to the end of the boom 28, and having an offset 36, sufficient to reach around the tree trunk. The extension is provided with an arcuate steel pad 38, to which may be added a thin vulcanized rubber pad 40, the pad having a sharp pin 42 located in the middle, that is adapted to project through the bark and into the tree trunk proper.

A similar opposing arcuate steel pad 44 is provided, the same being mounted on the end of a piston rod 46 projecting from the stuffing box end 48 of an operating cylinder 50 disposed in the end of the boom 28, the piston rod having a piston 52 within the cylinder. Hydraulic lines 54, 56 connected to the opposite ends of the cylinder are provided to actuate the piston and project the pad 44 against the trunk of a tree in opposition to the pad 38 and in alignment with the boom 28. A similar thin vulcanized rubber pad 60 may be employed on the pad 44, and a sharp pin 62 for piercing the bark and projecting into the tree trunk is provided. As shown in FIGURES 3 and 4, the pads 38 and 44 are preferably swivelly mounted on pivot pins 66 and 68, extending generally horizontally, to permit the pads to engage solidly upon a tree trunk, which may not be entirely vertical, or to permit the boom to engage a tree trunk that is vertical, even though the boom be not precisely horizontal.

The pads 40 and 60, and pins 42 and 62, are adapted to provide a solid grip upon the opposite sides of the trunk of a tree in alignment with the boom, and the sharp pins, by piercing somewhat into the tree trunk, prevents the gripping pads from shifting up or down or laterally, with respect to the trunk, once the grip is effected. In practice the pins need not be over a quarter of an inch in diameter, so as not to injure the tree, but the pins will be of hardened material capable of resisting any movement of the pads, either lengthwise or crosswise of the trunk, once a grip is effected. While the pads 40 and 60 may have some resiliency, the purpose of the pads is to provide an area of contact between the pads 38 and 44, such that injury to the tree trunk bark is prevented.

The vibratory inertia means, may comprise a pair of heavy shafts 80 and 82 journalled in heavy bearings 84, 86, 88 and 90 in the sides of a heavy casing 92, to which the end of the boom 28 is rigidly attached. Each of the shafts are provided with like meshing gears 94 and 96, to provide opposite rotation of the shafts 80 and 82, at identical speeds. Identical eccentric weights 98 and 100 affixed to the shafts 80 and 82, are so oriented as shown, so that both lie to the right, or to the left of their respective shafts, or one lies above the shaft, while the other lies below during rotation. In this manner, by rotation of the shaft 80 and 82 oppositely, the weights create vibratory inertia forces axially of the boom 28, while cancelling out vibration forces, transversely of the boom.

One of the shafts, 80 may be driven by a belt drive 110 from a variable speed hydraulic motor 112, mounted on the end of the casing 92.

A high pressure supply of oil or other motive fluid is provided as at 120, and such oil supply may be employed to operate the cylinder 50, through the connecting lines 54 and 56, and as controlled by a valve 122, the valve 122 holding the column of hydraulic liquid in cylinder 50 under pressure in line 56, to hold the clamp solidly about the tree trunk, at all times, when the vibratory inertia apparatus is in operation. The valve 124 may control flow of oil under pressure to motor 112, a bi-pass valve 126 or other means being provided to control the speed of the motor, it being understood that by gradually closing such valve the speed of the motor 112 is gradually increased.

In practice, the apparatus is brought into range of a tree, and the pad 38 seated against the far side of the tree trunk, following which oil pressure in introduced through conduit 56 to the cylinder to tightly engage the pads 38 and 44 about the tree trunk, and to force the pins 42 and 62 into the trunk to prevent lateral or vertical movement, once the grip is complete. When a firm solid grip upon the tree trunk has been effected, rotation of the inertia device 30 is commenced, the speed being accelerated until resonance of the system including the tree is reached. At this point maximum strain upon the fruit is effected, detachment of practically the entire harvest is effected almost simultaneously. At this time, in regard to cherry trees, the leaves stand on end and thereby indicate resonance. Thereupon the speed may be reduced, and the apparatus moved to the next tree. It will be observed that during the operation, the boom is freely suspended by the chain 26, and the point of attachment of the chain is so located as to balance the effective weight of the boom assembly, so that manipulation of the boom requires little effort. The boom may be rotated about its axis slightly to accommodate in connection with the swivel 66 and 68, any tree trunk out of plumb.

Any gathering cloth, canvas or other arrangement may be disposed about the tree to catch the harvest as is desired, and the same may be located either above or below the boom. Because the boom is rigidly attached to the trunk, which is relatively unmovable, no anchorage for the support 22 is required, and a tractor provided with a suspension arm similar to arm 24, need have no special braking equipment, since during the entire operation no perceptible movement of the apparatus takes place. In practice, a frequency range up to 4000 or 5000 revolutions per minute of the inertia shaft 80 will suffice to include a broad range of resonant frequencies, such as may be encountered by trees of various sizes. Because of the absence of relative movement between the apparatus and the tree, little power is required to accelerate the inertia device to such speed as is necessary to reach a resonant condition.

While the inertia device employs counter rotating weights on separate parallel shafts, many arrangements using such spaced shafts or coaxial shafts can be used. The orientation of the two inertia weights however shall be such that maximum vibration forces are transmitted axially of the boom.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A harvester for fruit trees having a trunk comprising in combination a tree trunk clamp having opposed clamping pads adapted to simultaneously engage the opposite sides of a tree trunk and apply presssure to said tree trunk along a clamp axis, extending substantially diametrically through the tree trunk, hydraulic means for actuating said clamp from open to closed position, and for solidly holding the clamp under pressure around the tree trunk, and vibration means rigidly affixed to said tree trunk clamp, and adapted to exert a vibratory force concentrated along the clamp axis, said vibratory means comprising a journal box rigidly attached to the clamp and having a pair of rotatable shafts with both shaft axes lying in a single plane substantially common to the clamp axis, and said shafts extending at right angles to the clamp axis, means for driving said shafts simultaneously at identical speeds but in opposite directions, equivalent inertia weights eccentrically affixed to each shaft, and adapted to rotate in parallel planes parallel with and close to the clamp axis, said weights being angularly disposed on their respective shafts so that on rotation, when both weights have their centers of gravity disposed horizontally to one side of their shafts, their respective centers of gravity are on the same side of their respective shafts, and when their centers of gravity are vertically disposed with respect to their respective shafts, the center of gravity of one weight is above its shaft and the center of gravity of the other is below its shaft, whereby rapid rotation of said weights creates substantially no vibration transversely of the clamp axis, and creates rapidly reversing forces in a horizontal direction substantially perpendicular to the axes of the shafts, and along the axis of said clamp means, and means for rapidly accelerating the rotation speed of said shafts through a speed range sufficient to include the resonant frequency of a tree the trunk of which the harvester is clamped to.

2. A harvester as set forth in claim 1, wherein the vibrator means and the clamp are affixed upon opposite ends of a boom, and said boom is suspended from a support by flexible means attached to the boom adjacent the center of balance of the harvester.

3. A harvester as set forth in claim 1 wherein the vibrating means and the clamp are affixed upon opposite ends of a boom.

4. A harvester as set forth in claim 1 wherein the accelerating means is a variable speed hydraulic motor.

5. A harvester as set forth in claim 1, wherein at least one of the clamp pads is provided with a sharp pin adapted to be embedded in the tree trunk substantially along the clamp axis to fix the clamp against movement relative to the tree trunk transverse of the clamp axis.

6. A harvester according to claim 1, wherein swivel means having horizontal axes connect the clamp pads to the clamp.

7. A harvester according to claim 6 wherein at least one clamp pad is provided with a sharp pin adapted to be embedded in the tree trunk substantially along the clamp axis to fix the clamp against movement relative to the tree trunk transverse of the pin axis.

References Cited

UNITED STATES PATENTS

| | | | |
|---|---|---|---|
| 2,769,298 | 11/1956 | Jones | 56—328 |
| 2,804,743 | 9/1957 | Gould et al. | 56—328 |
| 3,006,130 | 10/1961 | Jones | 56—328 |
| 3,059,402 | 10/1962 | Shipley | 56—328 |
| 3,206,919 | 9/1965 | Read | 56—328 |
| 3,225,529 | 12/1965 | King | 56—328 |

FOREIGN PATENTS 85,721  8/1920  Switzerland.

RUSSELL R. KINSEY, *Primary Examiner.*